D. S. SEYMOUR.
LOOPER THREAD CONTROLLER FOR SEWING MACHINES.
APPLICATION FILED NOV. 4, 1911.

1,201,645.

Patented Oct. 17, 1916.
5 SHEETS—SHEET 1.

WITNESSES

INVENTOR
Dudley S. Seymour
By Sturtevant & Mason
Attorneys

D. S. SEYMOUR.
LOOPER THREAD CONTROLLER FOR SEWING MACHINES.
APPLICATION FILED NOV. 4, 1911.

1,201,645.

Patented Oct. 17, 1916.
5 SHEETS—SHEET 5.

Witnesses
C. H. Walker.
Grace P. Brereton

Inventor
Dudley S. Seymour
By Sturtevant & Mason
Attorneys

UNITED STATES PATENT OFFICE.

DUDLEY S. SEYMOUR, OF OAK PARK, ILLINOIS, ASSIGNOR TO UNION SPECIAL MACHINE COMPANY, OF CHICAGO, ILLINOIS, A CORPORATION OF ILLINOIS.

LOOPER-THREAD CONTROLLER FOR SEWING-MACHINES.

1,201,645.  Specification of Letters Patent.  Patented Oct. 17, 1916.

Application filed November 4, 1911. Serial No. 658,556.

*To all whom it may concern:*

Be it known that I, DUDLEY S. SEYMOUR, a citizen of the United States, residing at Oak Park, in the county of Cook, State of Illinois, have invented certain new and useful Improvements in Looper-Thread Controllers for Sewing-Machines, of which the following is a description, reference being had to the accompanying drawing, and to the letters and figures of reference marked thereon.

The invention relates to new and useful improvements in sewing machines, and more especially to the thread-controlling mechanism for a looper.

An object of the invention is to provide a thread-controlling mechanism which includes an oscillating arm for taking up and giving up the looper thread, which arm is positively moved, so as to give thread to the looper when required thereby, and to take up the slack thread.

A further object of the invention is to provide a looper mechanism which embodies devices for moving the looper into and out of the needle loop and giving an extended dwell to the looper at the forward end of its stroke, with a looper thread controller which includes an oscillating arm, which is operated by the same differential mechanism that vibrates the looper.

A further object of the invention is to provide a device of the above character, wherein the devices for operating the thread arm include a differential mechanism, so that said thread arm may be moved quickly to give thread to the looper on its forward stroke, and may also be given the necessary dwell to avoid putting unnecessary strain on the looper thread when the looper is retracted from the needle loop.

These and other objects will in part be obvious, and will in part be hereinafter more fully described.

Figure 1:
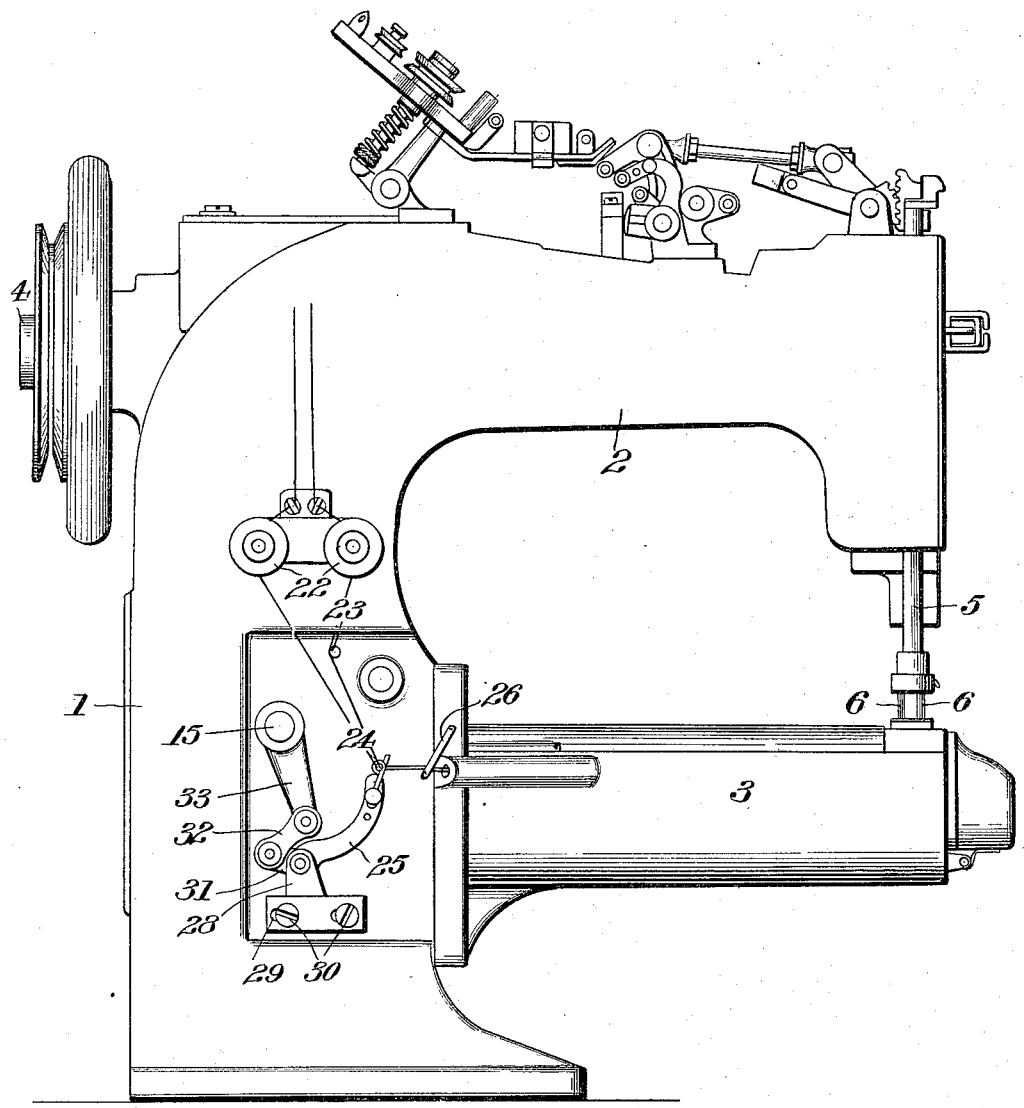
Figure 2:
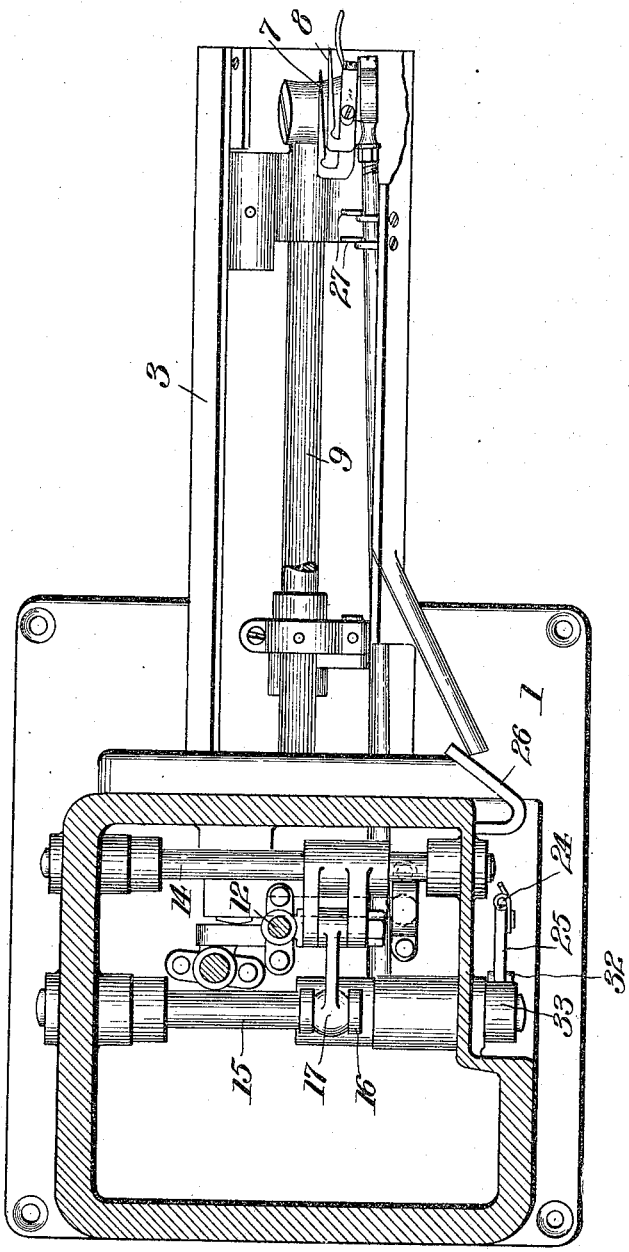
Figure 3:
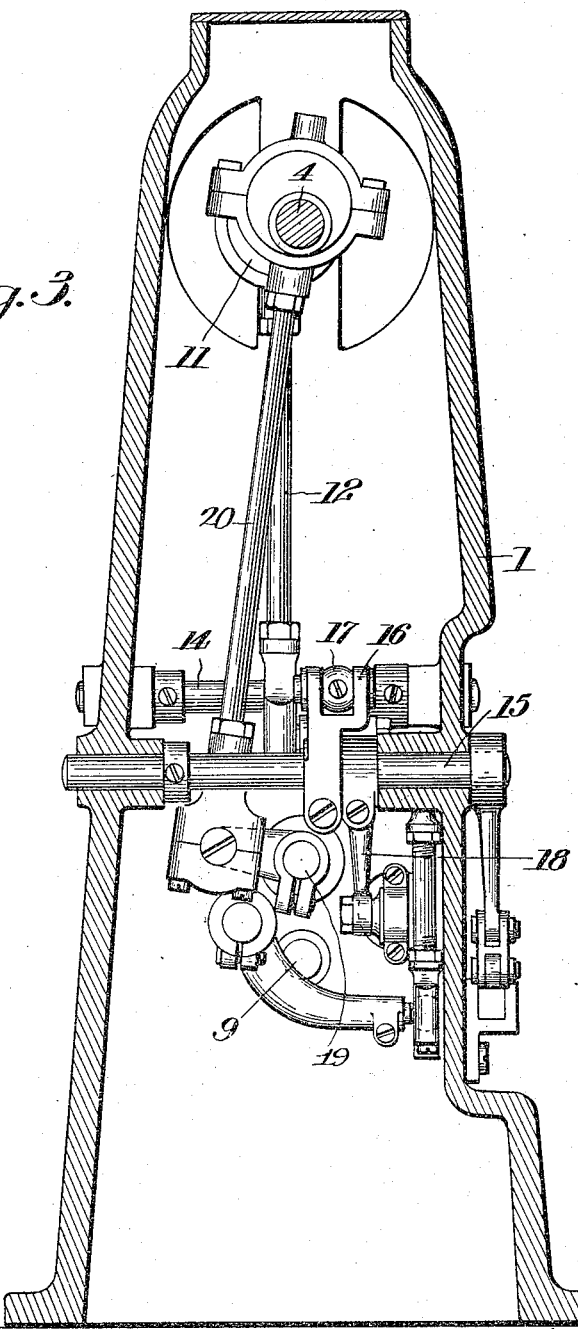
Figure 4:
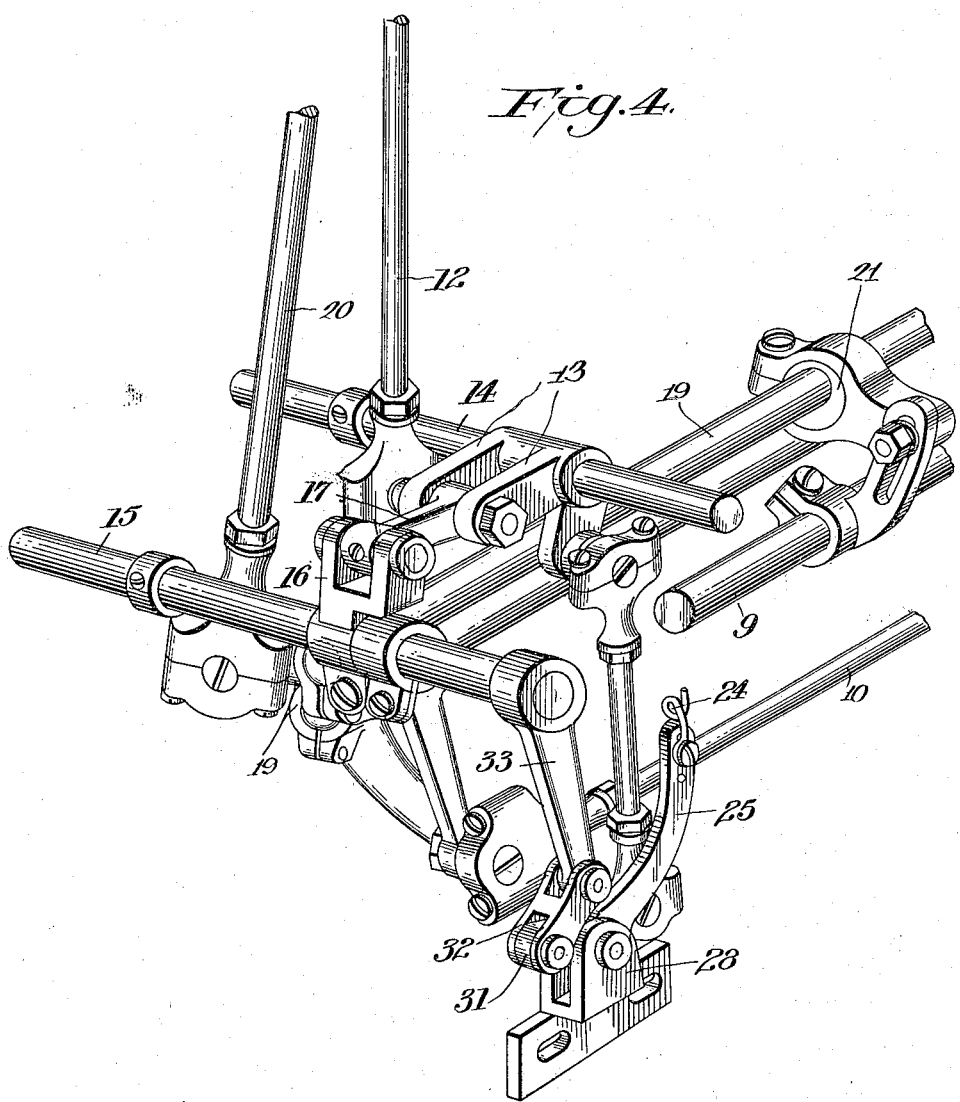
Figure 5:
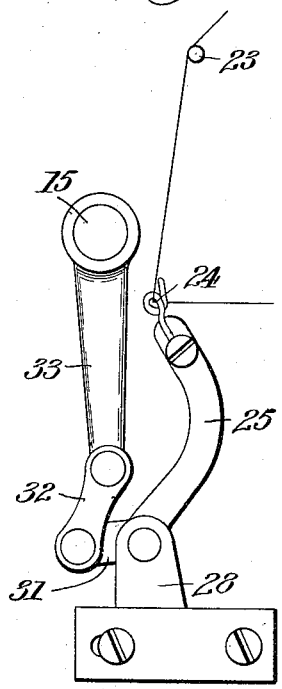
Figure 6:
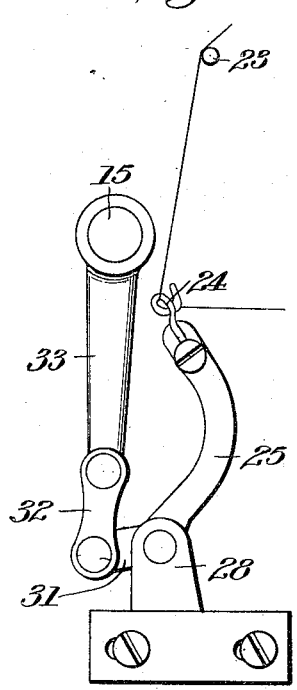
Figure 7:
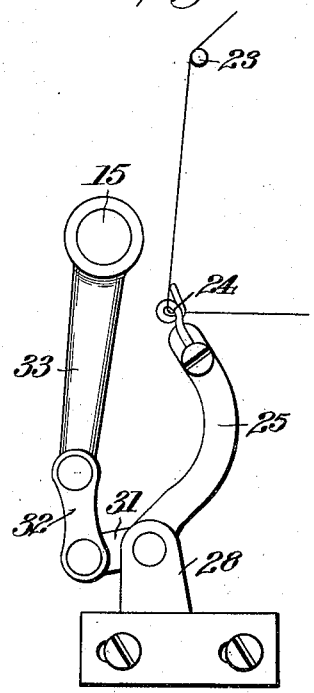
Figure 8:
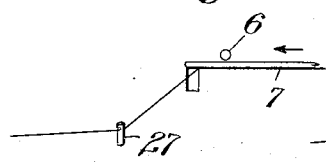
Figure 9:
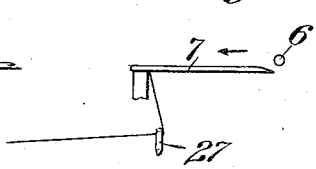
Figure 10:
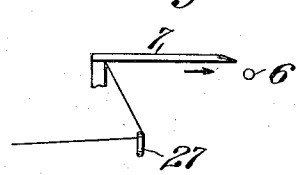

In the drawings which show by way of illustration one embodiment of the invention,—Figure 1 is a front elevation of a sewing machine having my improvements applied thereto; Fig. 2 is a horizontal sectional view, showing the looper-operating mechanism and the thread controller-operating mechanism in plan; Fig. 3 is a vertical sectional view through the standard of the machine; Fig. 4 is a detail in perspective, showing the mechanism for operating the looper and the thread-controller; Figs. 5 to 7 are diagrammatic views, showing the various positions of the looper thread-controlling arms; Figs. 8, 9 and 10 are diagrammatic views, showing various positions of the looper relative to the line of stitching and the thread eye therefor, the said views corresponding in timing to the positions of the thread arm indicated in Figs. 5 to 7, inclusive.

In the drawings, I have shown the invention as applied to a sewing machine of the cylindrical bed type, which comprises a supporting standard 1, an overhanging arm 2 and a cylindrical bed plate 3. Mounted in the overhanging arm is the main rotating shaft 4. The needle bar 5 is reciprocated from the main shaft 4 by suitable connecting devices.

The needle bar, as herein shown, is provided with a plurality of pairs of needles 6. One of the pairs of needles is arranged slightly in advance of the other, as is usual in this type of machine. Coöperating with the rear pair of needles is a looper 7, and with the front pair of needles is a looper 8. These loopers 7 and 8 are mounted on a carrier, which is pivoted to the forward end of a looper-supporting shaft 9. The looper carrier is oscillated about its pivotal support, so as to move the loopers into and out of the needle loops by a link 10.

The main shaft 4 carries an eccentric 11, which operates a link 12 which is pivoted at its lower end to a ball stud carried by an arm 13 mounted on a cross shaft 14 journaled in suitable bearings in the standard of the machine. This cross shaft 14 is arranged in a vertical plane cutting the axis of the main shaft at right angles. The arm 13 is carried by a collar fixed to the shaft 14, and a second arm 13 is arranged parallel thereto. These arms project to one side of the shaft 14. A second cross shaft 15 is arranged parallel to the shaft 14, and is provided with an upwardly projecting arm 16, having spaced members at its upper end. A link 17 is pivoted between the spaced members at one end, and between the ends of the arms 13 at its other end. The cross shaft 15 carries a downwardly projecting arm 18, which is connected to the link 10 for vibrating the loopers into and out of the needle loops. The arms 13 on the shaft 14 are arranged so that when the loopers are at the forward end of their stroke, said arm and link are substantially in line, and in fact may move slightly above alinement, so as to give an extended dwell to the looper at the forward end of its stroke.

The lateral movements of the loopers are accomplished by oscillating the looper-supporting shaft 9. A shaft 19 which is a part of the feed-operating mechanism, is mounted in suitable bearings in the bed plate and projects into the standard of the machine. This shaft carries an arm on its inner end which is connected to a link 20, which link 20 coöperates with an eccentric on the main driving shaft 4. As the main shaft rotates, the shaft 19 will be oscillated. Mounted on the shaft 19 is an eccentrically located disk 21. Coöperating with this disk 21 is an eccentric strap, which is pivoted at its outer end to an arm carried by the looper shaft 9. This mechanism vibrates the loopers laterally to give thereto the needle-avoiding movement, and is so timed that the loopers will be moved laterally while at the forward end of their stroke. This looper mechanism forms no part of the present invention, so far as the looper *per se* is concerned, but is shown, described and claimed in my co-pending application Serial No. 658,555, filed of even date herewith.

The upper thread-controlling mechanism shown herein has not been described, as this mechanism is not necessary to an understanding of the looper thread-controlling devices, and the same is shown, described and claimed in my co-pending application Serial No. 658,553 filed of even date herewith.

While I have shown my machine as provided with two loopers and two pairs of needles, it will be obvious that a single looper may be used, and that either a single pair or a single needle may be used in place of the construction herein shown. In describing the looper thread-controlling mechanism, I will, therefore, refer to a single looper, it being obvious that the same mechanism is or may be used to control a plurality of threads where more than one looper is used.

The looper thread is led from the supply through a tension 22. From the tension 22 the looper thread passes about a guiding pin 23, and through an eye 24 on a thread arm 25. From the eye 24 the said thread is led underneath a guiding wire 26, and through a slotted tube into the cylindrical bed plate 3. Said thread passes along the inner side of the bed plate to a thread-guiding eye 27, and thence to the eye at the heel of the looper. The thread arm 25 is pivoted on a bracket 28, which is provided with slots 29, whereby the same may be adjustably attached to the frame of the machine by screws 30.

The thread arm is formed with a projecting operating arm 31, which is pivoted to a link 32. The link 32 at its other end is pivoted to an arm 33, rigidly carried by the shaft 15. The shaft 15, as above noted, carries the arm 18, which vibrates the looper into and out of the needle loop, and, therefore, this same shaft, which is a part of the differential mechanism for moving the looper and giving a dwell at the forward end of the stroke of the looper, also moves the thread arm, and will give a similar dwell to the thread arm to that given to the looper.

The devices for moving the thread arm from the shaft 15 also include a differential mechanism, for the reason that the arm 33 and the link 32 move from a position at an angle to each other, as shown in Figs. 1 and 5, to a position in alinement, as shown in Fig. 6, where the thread arm will dwell, and said arm 33 may be also moved to a position at the left of alinement, so as to give a slight stroke to the thread arm.

It will be noted that the arm 33 and link 32 are in alinement, and the thread arm at a dwell at the opposite end of the stroke of the looper from that receiving a dwell through the looper-operating mechanism, so that it will be obvious the thread arm 25 is given a dwell at each end of its stroke. This particular movement of the thread arm secures decidedly advantageous results in connection with the movements of the looper. When the looper moves forward into the needle loop, slack thread should be given to the looper, so that it may move freely to the end of its stroke, as the looper thread is doubled upon itself as soon as the eye of the looper passes the needle. The thread arm 25 is not only moved to its extreme position at the right, as viewed in Fig. 1, while the looper is moving into the needle loop, but through the differential mechanism comprising the arm 33 and link 32, it will be moved very quickly, so that the looper thread will be freely given up to the looper.

As soon as the looper begins its retracting movement, the looper thread must be held taut, so that the thread running from the eye of the looper to the previous stitch will be held away from the looper to allow the needle point to pass between the looper thread and the body of the looper and into the so called "thread triangle", which is formed by the looper thread, the body of the looper and the needle loop of the previous stitch on the body of the looper.

As the looper begins its backward movement, the thread arm 25 will also begin its backward movement, for the reason that said thread arm is operated directly from the shaft which operates the looper. The looper thread will, therefore, be held taut during the first part of the retracting movement of the looper. After the needle point has passed the looper thread and the looper has moved sufficiently to drop the previous needle loop, the taking up of the looper thread by the thread arm should cease, for the reason that the looper thread is now around the needle and the looper should slip back upon the looper thread. At this time, the arm 33 and the link 32 have moved into alinement, so that the thread arm 25 comes to a dwell notwithstanding the fact that the shaft 15 which is moving the looper backward, continues its oscillation.

From Figs. 2 and 8 to 10, inclusive, it will be noted that the heel of the looper passes slightly to the left of the thread eye 27 as it approaches the rear end of its stroke. The heel of the looper would also be moved away from the thread guide 27 as the looper is shifted laterally to be positioned for its forward stroke. This movement of the looper to the left and away from the guide 27 will pull on the looper thread sufficiently to aid in drawing up any slack in the looper thread, and also aid the needle in drawing up the loops of the finished stitch well underneath the work, as is usual in this type of machine.

In order to prevent too great a strain on the looper thread when the tensions are adjusted for forming tight stitches, the thread arm 25 is given a slight forward movement at this time, by reason of the fact that the arm 33 and the link 32 move slightly to the left of alinement, as shown in Fig. 7. When the looper again moves forward, the thread arm will take up a little of the thread, as these parts move back again to alinement before the thread arm is given its long stroke to give thread to the looper. This taking up of the looper thread on the first part of its forward movement, prevents any accumulation of looper thread in front of the eye of the looper and the buckling thereof, which is liable to force the needle loop to one side and cause skipping of stitches.

In Fig. 5 I have shown diagrammatically the position of the thread-controlling arm when the looper is at the forward end of its stroke, as indicated in Fig. 8. In Fig. 6 I have shown the position of the thread arm when it is given a dwell, and at the time when the needle loop is being shed from the looper and the eye of the looper is passing the needle.

In Fig. 7, I have shown the thread arm as given a slight movement as the looper approaches the end of its stroke, as indicated in Fig. 10, so that the thread arm can give up a slight amount of thread to the looper.

From the above description, it will be apparent that I have provided a thread-controlling arm which is positively operated and given a dwell at each end of its stroke. Furthermore, said thread arm is so timed relative to the movements of the looper as to give up thread rapidly to the looper as it moves into the needle loop and a dwell with the looper at the forward end of its stroke. Then again the thread arm takes the looper thread as the looper is retracted, thus holding the looper thread taut until the needle point has passed below the looper thread, and as soon as the previous needle loop is shed from the looper, said thread arm is given a dwell, and finally a slight movement to give up thread to the looper, to allow the same to move to the extreme rear end of its stroke without placing undue strain on the looper thread. Said thread arm also takes up a slight amount of thread on the first part of the forward movement of the looper to prevent the buckling of the thread in front of the eye thereof.

While I have shown my thread-controlling arm as especially adapted for use in connection with the looper, it will be obvious from certain aspects of the invention, that said thread-controller arm may be used in connection with any thread-carrying implement, where it is desired to secure the timing of the thread arm relative to the movements of the implement, as above described.

It is obvious that minor changes in the details of construction and arrangement of parts may be made, without departing from the spirit of my invention, as set forth in the appended claims.

Having thus described my invention, what I claim as new and desire to secure by Letters Patent, is:—

1. A sewing machine including in combination, a looper, means for moving the looper into and out of the needle loop and giving a dwell thereto at the forward end of its stroke, and a thread controller for said looper thread including a thread arm and means for operating said thread arm from said looper moving means, including devices for giving a differential movement to the thread arm, relative to the looper whereby said thread arm is caused to give thread to the looper quickly as it moves to the forward end of its stroke, and to take up thread quickly during a portion of the backward stroke of the looper.

2. A sewing machine including in combination, a looper, means for moving the looper into and out of the needle loop and giving a dwell thereto at the forward end of its stroke, and a thread-controller for said looper thread including a thread arm and a differential mechanism for operating said thread arm, whereby said thread arm is caused to give thread to the looper quickly as it moves to the forward end of its stroke, and to take up thread quickly during a portion of the backward stroke of the looper, said differential mechanism being constructed to give to the thread arm a dwell after the eye of the looper passes the needle in its retracted movement.

3. A sewing machine including in combination, a looper, means for moving the looper into and out of the needle loop and giving a dwell thereto at the forward end of its stroke, a thread-controlling mechanism for the looper thread including a thread arm, and means for operating said thread arm from the looper moving means, whereby said arm is caused to dwell with the looper, said means including devices for moving said thread arm quickly to give up thread to the looper as it moves to the forward end of its stroke, and to take up the looper thread as the looper is retracted, and to give said thread arm a dwell after the eye of the looper in its retracted movement passes the needle.

4. A sewing machine including in combination, a looper, means for moving the looper into and out of the needle loop and giving a dwell thereto at the forward end of its stroke, a thread-controlling mechanism for the looper thread including a thread arm, a bracket for supporting said arm, means whereby said bracket may be adjusted, and means for oscillating said arm from the looper-operating mechanism, whereby the thread arm is caused to dwell with the looper, said means including a differential mechanism, whereby the thread arm is moved quickly to give up and take up thread.

5. A sewing machine including in combination, a looper, means for moving the looper into and out of the needle loop and giving a dwell thereto at the forward end of its stroke, a thread-controlling mechanism for the looper thread including a thread arm, a bracket for supporting said arm, means whereby said bracket may be adjusted, and means for oscillating said arm from the looper-operating mechanism, whereby the thread arm is caused to dwell with the looper, said means including a differential mechanism, whereby the thread arm is moved quickly to give up and take up thread, and whereby said thread arm is caused to dwell after the eye of the looper passes the needle in the return movement thereof.

6. A sewing machine including in combination, a looper, means for moving the looper into and out of the needle loop and giving a dwell thereto at the forward end of its stroke, a thread-controlling mechanism for the looper thread including a thread arm, an arm carried by and moving with the looper-operating mechanism, and a link connecting said arm to the thread arm, said link and said arm on the looper mechanism being so disposed as to move into and out of alinement.

7. A sewing machine including in combination, a looper, means for moving the looper into and out of the needle loop and giving a dwell thereto at the forward end of its stroke, a thread-controlling mechanism for the looper thread including a thread arm, an arm carried by and moving with the looper-operating mechanism, and a link connecting said arm to the thread arm, said link and said arm on the looper mechanism being so disposed as to move into and out of alinement, a bracket for supporting said thread arm, and means for adjusting the bracket.

8. A sewing machine including in combination, a looper, means for moving the looper into and out of the needle loop and giving a dwell thereto at the forward end of its stroke, a thread arm for controlling the looper thread, devices operated from the looper operating mechanism for operating the thread arm, whereby said thread arm is caused to dwell with the looper, said devices including means for causing the thread arm to dwell near the opposite end of the stroke of the looper.

9. A sewing machine including in combination, a looper, means for moving the looper into and out of the needle loop and giving a dwell thereto at the forward end of its stroke, a thread arm for controlling the looper thread, devices operated by the looper operating mechanism for operating the thread arm, whereby said thread arm is caused to dwell with the looper, said devices including means for causing the thread arm to dwell near the opposite end of the stroke of the looper, a bracket for supporting the thread arm, and means for adjusting the bracket, whereby the timing of the thread arm may be varied.

10. A sewing machine including in combination, a looper, means for moving the looper into and out of the needle loop, a thread guide for the looper thread at one side of and adjacent the heel of the looper, whereby the looper heel in its return stroke moves beyond said thread guide, a thread arm for controlling the looper thread, means for vibrating said arm to take up and give up thread while the looper is moving at one side of said thread guide, and means for vibrating said arm to take up and give up thread while the looper heel is moving at the other side of said thread guide.

11. A thread controlling mechanism, including in combination a thread carrying implement, a thread arm for engaging the thread of said implement, thread guides coöperating with said arm, and means for giving said arm two reciprocations away from said guides for one complete reciprocation of the implement and for causing said arm to dwell between said reciprocations.

12. A thread controller for sewing machine including in combination, a thread arm, an oscillating shaft, an arm carried by the oscillating shaft, a link connecting said arm to the thread arm, said link and said arm of the oscillating shaft being so disposed as to move into and out of alinement.

13. A thread controller for sewing machines including in combination, a thread arm, an oscillating shaft, an arm carried by the oscillating shaft, a link connecting said arm to the thread arm, said link and said arm of the oscillating shaft being so disposed as to move across alinement, whereby two oscillations of the thread arm are given for one oscillation of the arm carried by the oscillating shaft.

14. A thread controller for sewing machines including in combination, a thread arm, an oscillating shaft, an arm carried by the oscillating shaft, a link connecting said arm to the thread arm, said link and said arm of the oscillating shaft being so disposed as to move across alinement, whereby two oscillations of the thread arm are given for one oscillation of the arm carried by the oscillating shaft, a bracket for supporting said thread arm, and means for adjusting the bracket, whereby the timing of the thread arm may be varied.

15. A sewing machine including in combination, a rotary shaft, a shaft at right angles thereto and oscillated thereby, a looper operatively connected to said oscillating shaft, an arm oscillated by said shaft, a looper thread arm and differential mechanism connecting said thread arm to the arm carried by said oscillating shaft.

16. A sewing machine including in combination, a rotary shaft, a looper, a shaft supporting the same, means for imparting a variable movement to the looper, a thread arm for the looper thread, and a differential mechanism therefor with connections between said differential mechanism and the means for giving the looper a variable movement.

17. A thread controlling device, including in combination an operating shaft, a pivoted arm, means for giving a differential oscillating movement to said arm, a second pivoted arm, a thread guide carried by said second arm, thread guides coöperating with the guide on said arm, and means for giving said second arm a differential oscillating movement from said first named arm.

In testimony whereof I affix my signature, in presence of two witnesses.

DUDLEY S. SEYMOUR.

Witnesses:
C. S. STURTEVANT,
C. MCNEIL.